United States Patent
Rayas et al.

[11] Patent Number: 6,045,868
[45] Date of Patent: Apr. 4, 2000

[54] METHOD FOR THE PREPARATION OF TRANSPARENT CROSS-LINKED POLYMERS FROM GRAIN FLOUR

[75] Inventors: Luis M. Rayas, Plymouth, Minn.; Ruben J. Hernandez, East Lansing, Mich.

[73] Assignee: Board of Trustees operating Michigan State University, East Lansing, Mich.

[21] Appl. No.: 09/225,947

[22] Filed: Jan. 6, 1999

[51] Int. Cl.$^7$ .................................................. B05D 3/02
[52] U.S. Cl. ........................................ 427/384; 530/374
[58] Field of Search ............................ 427/384; 530/374

[56] References Cited

U.S. PATENT DOCUMENTS

| | | |
|---|---|---|
| 3,493,384 | 2/1970 | Fellers . |
| 3,498,965 | 3/1970 | Fellers . |
| 3,501,451 | 3/1970 | Fellers . |
| 3,542,754 | 11/1970 | Fellers . |
| 3,574,180 | 4/1971 | Johnston et al. . |
| 3,653,925 | 4/1972 | Anker, et al. . |
| 3,951,938 | 4/1976 | Kerkkonen et al. . |
| 4,132,566 | 1/1979 | Verberne et al. . |
| 4,494,530 | 1/1985 | Jansma et al. . |
| 5,472,511 | 12/1995 | Rayas et al. . |

OTHER PUBLICATIONS

Ewart, J. Sci. Food Agr., 19(7), pp. 370–3, 1968.
Lipparini, Quad. Merceol., 9(2), pp. 147–53, 1970.
Yu et al, J. Ferment. Bioeng., 84(5), pp. 444–448, 1997.
Rayas et al, J. Food Sci., 62 (1), pp. 160–162, 1997.
Gennadios et al., Food Tech., 44(10) :63 (1990).
Krull et al., Industrial Used of Gluten, Cereal Science Today, 16(8) :232 (1971).
Gennadios et al., J. Food Sci., 58(1) :212 (1993).
Gontard et al., J. Food Sci., 58(1) :206 (1993).
Gontard et al., J. Food Sci., 57(1) :190 (1992).
Magnuson, K.M., Cereal Food World 30(2) :17 (1985).

*Primary Examiner*—Erma Cameron
*Attorney, Agent, or Firm*—Ian C. McLeod

[57] ABSTRACT

A method wherein grain flour proteins are cross-linked with aldehydes and bleached with a bleaching agent to form cross-linked transparent polymers is described. The process uses ethanol and water for the extraction at acid or basic pH's and optionally heating with or without a reducing agent to provide the polymers to be bleached and cross-linked. The polymers are particularly useful as films for packaging.

17 Claims, 1 Drawing Sheet

METHOD FOR THE PREPARATION OF TRANSPARENT CROSS-LINKED POLYMERS FROM GRAIN FLOUR

BACKGROUND OF THE INVENTION

(1) Field of the Invention

The present invention relates to cross-linked, transparent gluten based polymers, and their method of preparation from grain flours. More specifically, the present invention uses film-forming solutions of gluten proteins obtained directly from grain flour which are cross-linked with a cross-linking agent which reacts with acidic and amino groups in the proteins. The transparent polymers particularly provide inexpensive, and biodegradable films and coatings.

(2) Description of Related Art

There are currently many polymer films used in industry. Although recycling programs have been developed, there is still a lot of waste of these single use products. Pollution by their very low degradation potential has elicited significant concern in the industry, government, and ecological groups. Edible and/or biodegradable films and coatings have been developed using polymeric materials such as proteins (U.S. Pat. No. 3,653,925, to Anker et al, issued Apr. 28, 1972). There is currently limited applications for these films in the industry because of their poor water barrier and mechanical properties, as explained by Gennadios and Weller (Gennadios et al., Food Tech., 44(10):63 (1990)) and Krull and Inglett (Krull et al., Industrial uses of gluten, Cereal Science Today, 16(8):232 (1971)). In the development of edible and/or biodegradable films and coatings in which protein is used as the primary polymeric material, most of the current methods developed are based on U.S. Pat. No. 3,653,925, to Anker et al. This U.S. patent approaches the preparation of the film or coating by using dried wheat gluten (powder), available commercially or easily fabricated in a laboratory by various methods. In this case, vital wheat gluten (see AACC Method 38–20), which is a powder made from whole gluten, is rehydrated and a film-forming solution is formed after combination with other compounds. Examples of these methods include those by Gennadios et al (Gennadios et al., J. Food Sci., 58(1):212 (1993)), Gontard et al (Gontard et al., J. Food Sci., 58(l):206 (1993)), Gontard et al (Gontard et al., J. Food Sci., 57(1):190 (1992)), Gennadios and Weller (Gennadios et al., Food tech., 44(10):63 (1990)), and Magnuson (Magnuson, K. M., Cereal Food World 30(2):17 (1985)). Another method of preparation is based on using whole gluten, as explained by Krull and Inglett (Krull et al., Industrial uses of gluten, Cereal Science Today., 16(8): 232 (1971)).

There have been some approaches to separating gluten and starch from wheat flour (U.S. Pat. Nos. 4,494,530 issued Jan. 22, 1985 to Jansma et al; No. 4,132,566 issued Jan. 2, 1979 to Verberne et al; 3,951,938 issued Apr. 20, 1976 to Kerkkonen et al; 3,574,180 issued Apr. 6, 1971 to Johnston et al; 3,542,754 issued Nov. 24, 1970 Fellers; U.S. Pat. No. 3,501,451 issued Mar. 17, 1970 Fellers; 3,498,965 issued Mar. 3, 1970 to Fellers and 3,493,384 issued Feb. 3, 1970 to Fellers). The disadvantage of some of these processes is that the protein concentrates yielded are not designed as film-forming solutions, but as protein supplements in some foods, e.g. breads, animal feeds, base for preparing milk-like beverages and the like. In other methods the objective is to prepare vital gluten powders once the solution is dried and pulverized. Finally, other methods are interested only in the separation of starch and protein from the flour.

U.S. Pat. No. 5,472,511 to Ravas et al describes a method for separating protein from grain flours which are used to form films. This method is used in the method of the present invention to provide the cross-linkable gluten polymers.

SUMMARY OF THE INVENTION

The present invention relates to a method for forming a transparent polymer which comprises: providing a defatted and destarched gluten dissolved in an aqueous solution of a water miscible solvent for the gluten solution; mixing the solution with a cross-linking agent which reacts with the gluten and a bleaching agent which bleaches the gluten in the presence of the cross-linking agent, wherein the gluten is cross-linked to provide a polymer in the solution; casting the polymer in the solution; and drying the polymer to remove at least a portion of the ethanol and water and to provide the transparent polymer.

Further the present invention relates to a method for the preparation of a transparent polymer which comprises: providing a flour from a cereal grain; mixing the flour with an organic solvent which dissolves the fat which is removed with the solvent to provide a defatted flour; mixing the defatted flour with ethanol in water solution at a pH between about 3 and 6 to dissolve a gluten fraction in the defatted flour which solution is removed from any non-dissolved materials, including starch; mixing the gluten fraction in the solution with a cross-linking agent which reacts to form a transparent film with the gluten fraction and a bleaching agent which bleaches the gluten fraction in the presence of the cross-linking agent, wherein the gluten fraction is cross-linked to provide a polymer in the solution; casting the polymer in the solution on a surface; and drying the polymer on the surface to remove at least a portion of the solution and to provide the transparent polymer.

Finally the present invention relates to a polymer composition which comprises a bleached, cross-linked and substantially pure gluten from a cereal grain which is transparent. The cross-linking agent preferably forms imido groups from the amine groups of the protein.

OBJECTS

It is an object of the present invention to provide a novel method for the preparation of transparent, cross-linked polymers of proteins from grain, particularly wheat. It is further an object of the present invention to provide films from the proteins produced by the method which are relatively strong, biodegradable. Further, it is an object of the present invention to provide a method which is economical and easy to perform. These and other objects will become increasingly apparent by reference to the following description and the drawings.

DESCRIPTION OF PREFERRED EMBODIMENTS

Figure 1:
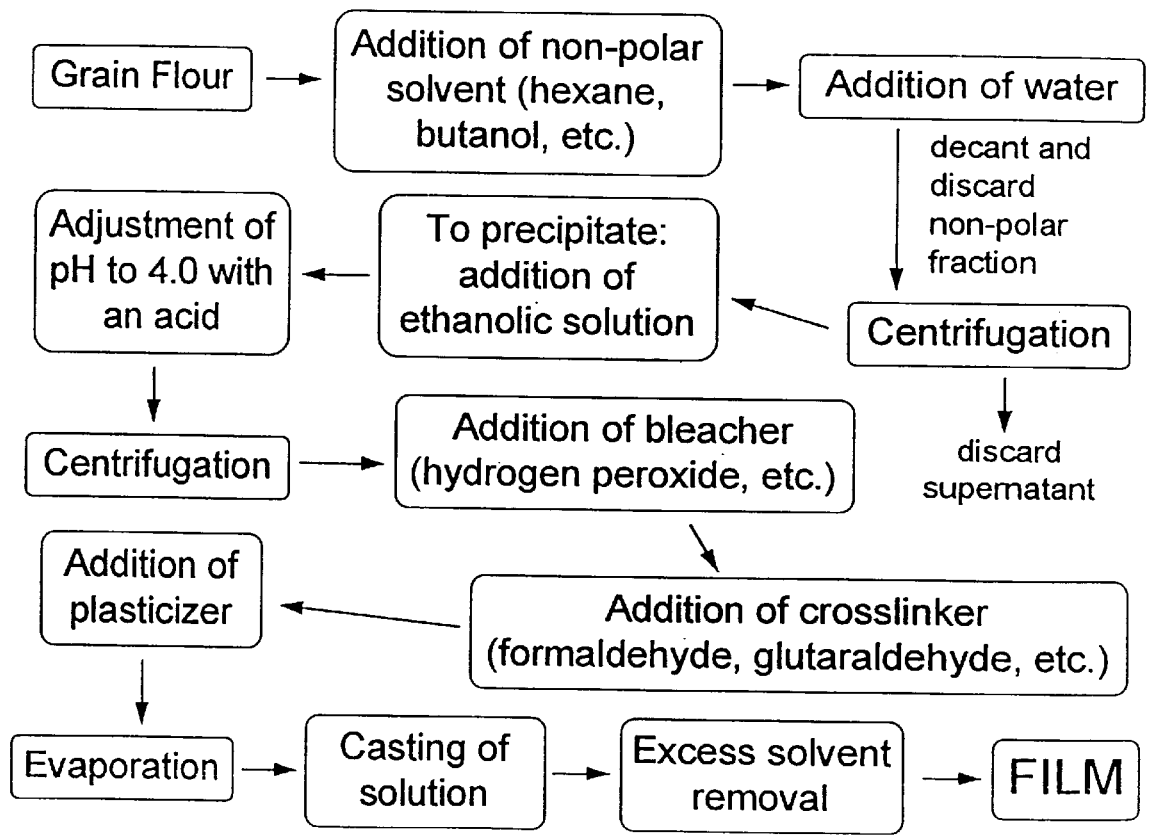
FIG. 1 is a schematic view of the steps in the method of the present invention for forming the cross-linked transparent polymers from grain proteins.

The method of the present invention involves the separation of biopolymeric materials from grain flours to make plastic films, coatings and other cast products. The preferred plastic material is strong, highly transparent, colorless, edible, degradable by sunlight and microorganisms (bio- and photo-degradable) and provides a good oxygen barrier and flavors. The plastic material has an appearance similar to synthetic polymer films which are not protein derived.

Traditional methods of preparation of grain flour based plastics do not separate the compounds that yield opaqueness and/or granular texture on the final films. In the present invention, the biopolymers are cleanly separated from the rest of the flour components by a solubilization process with selected solvents. Once separated, the grain flour biopolymers are cross-linked and plasticized to form a film-forming solution. Products can then be cast from the film-forming solution. The films are particularly useful for industrial packaging, especially in the food, pharmaceutical, and cosmetic industries.

The detailed steps involved in the manufacture of grain flour-based plastics are presented in the diagram of FIG. 1. The method can be continuous or batch process line. Film forming machinery available in the polymer industry today may be used for the method with minor changes or modifications for the viscosity of the solution to be cast.

The present invention thus relates to the preparation of transparent, cross-linked polymers. The invention particularly relates to the films and coatings resulting from the film-forming solution.

The preparation of polymers according to U.S. Pat. No. 5,472,511 to Ravas et al is a preferred starting point for the present invention. The disclosure of the patent is incorporated herein by referenced. No initial steps of separation of gluten from flour and drying of the isolated gluten are necessary, thus a lower energy cost is achieved. The total flour proteins obtained in the solution are the primary products. The materials and reagents necessary for the process operation are inexpensive. There is potential for total recovery of products, that is, starch can be recovered in the precipitate after the centrifugation process; the solvent solution when evaporated in the concentration step of the film-forming solution can also be recovered by condensation. The solution has a high protein content, which is increased when evaporation of the solvent is performed. The heating of the solution is preferred in order to denature the native structure of the flour proteins and to promote the interaction of protein chains among each other and improve the resulting edible and/or biodegradable mechanical properties of the film. The problem has been that the films formed directly from the protein, without cross-linking are not sufficiently reliable and strong enough to be commercially useful. In the present invention a cross-linking agent and a bleaching agent are preferably used together to form the novel polymers of the present invention which are transparent.

The preferred grain flour is wheat flour. Other flours which can be used are corn flour, barley flour, rice flour and other grain flours. Any type of wheat flour, i.e. soft, hard, blends, and the like can be used to produce film-forming solutions. Based on the initial flour quantity employed, soft wheat flour, because of its generally lower protein content produced film-forming solutions that yielded films with inferior mechanical properties without cross-linking. On the other hand, hard wheat flour, known for its high protein content, resulted in films with better mechanical properties without cross-linking. These differences are connected in part by cross-linking.

The acids which can be used to adjust the pH are for instance acetic acid, lactic acid and sulfuric acid and other edible acids. Acetic acid is preferred. The bases which can be used to adjust the pH are for instance sodium hydroxide and ammonium hydroxide. Sodium hydroxide is preferred.

The films are cast on a surface using the solution remaining after bleaching and reaction with the cross-linking agent and then the film is removed from the surface.

The films can have any shape when the film-forming solution is used to produce coatings, while an inert flat surface is required when films are the product of intention. Parting agents can be used to facilitate removal of the film from the surface in either case.

During the preparation of the slurry with the flour, the addition of alcohol (ethanol) into the solution is necessary in order to dissolve the gliadin fraction of the flour proteins. The alcohol used in this invention is ethanol, which is inexpensive and has been shown to effectively solubilize the gliadin fraction of flour proteins. The ethanol is found to dissolve the gliadin fraction efficiently when added in concentrations between 50 and 95 percent with respect to water. At concentrations lower than 50 percent alcohol, the film-forming solution yields non-continuous films or coatings without cross-linking and the drying process time in the film is increased because of the lower volatility of the water present in greater amount. At concentrations of more than 95 percent alcohol, the film-forming solution does not contain all of the protein that can be extracted thus yielding films with lower protein content.

The ethanol-water solution contain the acid or the base. Either of these will help in solubilizing the glutenin fraction in the film-forming solution. The acid-containing solutions yield light-yellow transparent films while the ones obtained using a base are yellowish translucent in appearance without bleaching. The acid used in this invention is preferably acetic acid, which is a volatile acid that can be recovered when the film is dried. When using an acid, this is added in quantities such that the final pH of the film-forming solution is about 4 with a range of 3 to 6. At pH below 3 the films obtained from the film-forming solution in this invention have poor properties while the films obtained at pH greater than 6 are not homogeneous nor easily handled.

The preferred method in which a base is used includes sodium hydroxide or ammonium hydroxide. Sodium hydroxide is a non-volatile base that will remain in the film. Ammonium hydroxide is a volatile base that will evaporate when the film is being dried. The final pH of the film-forming solution when using a base is in the range of 10 to 12, with an optimum pH of 11. Below pH 10 the film-forming solution will yield sticky films difficult to manage while above pH 12 the films do not form.

Centrifugation of the acid or base slurry solution obtained is necessary and the most important step in order to achieve separation of the starches from the protein solution, thus obtaining the film-forming solution. The relative centrifugal force (RCF), "g", in this invention is greater than 1000×g. Good separation with shorter time is achieved when RCF is 27500×g for 10 minutes. Lower RCF than 1000×g require longer periods of time to obtain good separation which increases costs of operation.

A heating process is preferred in order to concentrate the film-forming solution and denature the flour proteins prior to cross-linking and bleaching so that more protein interactions occur when the film is dried and stronger films are formed. The heating process in this invention must be in the range of 30° C. up to the boiling point of the solution, with a preferred range of 60° C. up to the boiling point. This is in order to get the unfolding of the protein molecules to form stronger films and/or coatings. In the evaporation process the volatiles can be recovered by condensation and re-used by adjusting the content of the solution components. When a heating process is used, it can be stopped after the coldest point in the solution reaches the desired temperature, i.e., after at least 5 minutes if the temperature is 30° C. or 60° C.

or immediately when the solution starts to boil. This is done to ensure that the protein unfolding occurs. Vacuum can be applied to solutions warmed below the boiling point in order to volatilize the solvent and concentrate the film-forming solution.

The solution so treated is mixed with the bleaching agent and the cross-linking agent. The bleaching agent is preferably hydrogen peroxide. Other bleaching agents are ozone which forms hydrogen peroxide in water and other hydrogen peroxide releasing agents such as barium peroxide. The cross-linking agent is preferably a difunctional aldehyde which reacts with the protein such as formaldehyde and glutaraldehyde. Other cross-linking agents are:

p, p'-difluoro-m,m'-di-nitrodiphenylsulfone.
1,5-difluoro-2,4-dinitrobenzene.
1-Fluoro-2-nitro-4-Azidobenzene.
Phenol-2,4-disulfonyl chloride; α-naphthol-2,4-disulfonyl chloride.
Adipate bis-(p-nitrophenyl ester.
carbonyl bis(methionine p-nitrophenyl ester.
Tartaryl diazide; Tartryl bis-(glycylazide).
Succinate bis-(hydroxy-succinimide ester).
N-(Azidonitrophenyl) γ-aminobutyrate hydroxy-succinimide ester.
1,3-dibromoacetone.
p-azidophenacyl bromide.
1,1-bis-(diazo acetyl)-2-phenylethane.
1-diazoacetyl-1-bromo-2-phenylethane.
Bis diazo benzidine.
Glutaraldehyde.
Polymethylene (n-3-12) di-imidates.
The cross-linking bonds which are formed contain imido groups from the available amine groups of the protein.

Plasticizers such as glycerol and other polyols such as ethylene glycol are preferably be added to the solution for incorporation into the polymer. These chemicals are well known for their ability to increase the flexibility of the films.

When no or minimal volatilization (evaporation) of the solvent from the film-forming solution is performed, the non cross-linked films obtained from the film-forming solutions are very thin when poured on an inert flat surface (e.g., glass, PLEXIGLAS and the like), as compared with volatilized film-forming solutions which produce thicker films when poured on the same surface. Also, when no or minimal volatilization of the solvent from the film-forming solution is performed, the film-forming solution can be poured into a container having an inert flat surface. The container is allowed to dry under controlled temperature, preferably above 35° C. so that evaporation of the solvent occurs between 10 to 48 hours, and then the film is peeled off the surface. The total evaporated solvent from the film-forming solution prior to casting of the film in this invention is from zero to 90%. More than 90% of the solvent evaporated prior to casting yields film-forming solutions difficult to manage and increases the process energy required to volatilize the remaining solvent. This is due to interactions of the solvent within the biopolymer structure. Evaporation of 75% of the solvent from the film-forming solution yields film-forming solutions which are easy to handle, e.g., pour and spread, thus increasing processability.

Polyols, preferably glycerol (glycerin) are added to the film-forming solution so that it yields non-brittle films and/or coatings. The amount of polyol is based on the total initial flour weight, so that it is 3% (w/w), preferably with a range from 1 to 5% of the flour weight or a range from 8 to 45% (w/w) in the final film. This addition to the film-forming solution is done preferably at the stage just before the film casting process. If the glycerol is added prior to that, it binds some of the solvent molecules in the solution and increases the evaporation time, thus increasing operation costs. Addition of more than 5% (w/w) polyol based upon the flour weight into the film-forming solution yields sticky films and/or coatings difficult to manage and poorer in barrier properties than films obtained with a lower polyol concentration. An amount lower than 1% (w/w) polyol used in the film-forming solution produces films and/or coatings that are brittle and break easily over a small period of time. Other additives which function as film modifiers can be incorporated into the film-forming solution prior to casting the films. This is done by adding them while the film-forming solution is still warm and requires stirring. It is most preferred that the additives be introduced at this stage because of the possibility of loss during the evaporation process or their alteration during the heating process itself during the required time of intense heating.

A reducing agent can be used to reduce the disulfide bonds in the proteins. This lowers the molecular weight of the proteins and provides good films. Any reducing agent can be used. Cysteine, sulfur dioxide or sodium bisulfite can be used in edible films as reducing agents. The reducing agent is eliminated prior to cross-linking.

The method and the products of this invention are further demonstrated by the following illustrative examples.

EXAMPLE 1

This example shows a transparent film formed using hexane as the non-polar solvent to defat the flour, glycerol as plasticizer, and formaldehyde solution as the cross-linking agent.

To 150 g bread wheat flour, 600 ml solution of mixture of hexanes was added and the slurry stirred for 15 minutes. The slurry was centrifuged at 9,900×g for 10 minutes. The supernatant or any upper layer were discarded and the precipitate was washed with 500 ml 0.5 M NaCl solution stirring for 15 minutes after which was centrifuged at 9,900×g for 10 minutes. The precipitate was washed two more times for 10 minutes with 500 ml distilled water after which was centrifuged at 9,900×g for 10 minutes. After these washes, all of the supernatant or upper layers were disposed of. A mixture of 530 ml 95% ethyl alcohol (ethanol) and 190 ml distilled water was added to the final precipitate and the slurry was stirred using a magnetic stirrer for 30 minutes at room temperature. The pH of the slurry was adjusted from 5.85 to 4.0 with 4.5 ml glacial acetic acid while continuously mixing. The slurry was centrifuged at 9,900×g for 15 minutes. To the supernatant, 0.85 ml hydrogen peroxide were added followed by addition of 0.75 ml formaldehyde solution. Two and a half grams (2.5g) of the plasticizer glycerol were added and the mixture was then evaporated until about ¼ of the initial liquid remained. The solution was cast on an inert flat surface (glass) using a thin-layer chromatography spreader apparatus set to 1 mm thickness. The film was dried at room temperature (24% RH) for 24 hours. After drying, the film was easily removed from the surface. The dried film weighed 7.5 g, was transparent, flexible, strong, and had a thickness of 2.7 mil.

EXAMPLE 2

This example shows a transparent film formed using butanol as the non-polar solvent to defat the flour, glycerol as plasticizer, and formaldehyde solution as the cross-linking agent.

To 150 g bread wheat flour, 600 ml butanol was added and the slurry stirred for 15 minutes. The slurry was centrifuged at 25,000×g for 10 minutes. The supernatant or any upper layer were discarded and the precipitate was washed with 500 ml 0.5 M NaCl solution stirring for 15 minutes after which was centrifuged at 9,900×g for 10 minutes. The precipitate was washed two more times for 10 minutes with 500 ml distilled water after which was centrifuged at 9,900×g for 10 minutes. After these washes, all of the supernatant or upper layers were disposed of. A mixture of 530 ml 95% ethyl alcohol (ethanol) and 190 ml distilled water was added to the final precipitate and the slurry was stirred using a magnetic stirrer for 30 minutes at room temperature. The pH of the slurry was adjusted from 6.01 to 4.0 with 9.0 ml glacial acetic acid while continuously mixing. The slurry was centrifuged at 25,000×g for 15 minutes. To the supernatant, 0.85 ml hydrogen peroxide were added followed by addition of 0.75 ml formaldehyde and 0.5 ml of a 0.5N HCl (catalyst for formaldehyde) solutions. The film forming solution was then refluxed for 2 hours at boiling point (83° C.). Two and a half g (2.5 g) of the plasticizer glycerol were added and the mixture was then evaporated until about ¼ of the initial liquid remained. The solution was cast on an inert flat surface (glass) using a thin-layer chromatography spreader apparatus set to 1 mm thickness. The film was dried at room temperature (24% RH) for 24 hours. After drying, the film was easily removed from the surface. The dried film weighed 6.0 g, was transparent, flexible, strong, and had a thickness of 5 mil.

EXAMPLE 3

This example shows a transparent film formed using hexane as the non-polar solvent for defatting the flour, glycerol as plasticizer, and formaldehyde solution was the cross-linking agent with HCl as a catalyst.

To 150 g bread wheat flour, 600 ml hexane (pure) was added and the slurry stirred for 15 minutes. The slurry was centrifuged at 20,00×g for 10 minutes. The supernatant or any upper layer were discarded and the precipitate was washed with 500 ml 0.5M NaCl solution stirring for 15 minutes after which was centrifuged at 9,900×g for 10 minutes. The precipitate was washed two more times for 10 minutes with 500 ml distilled water after which was centrifuged at 9,900×g for 10 minutes. After these washes, all of the supernatant or upper layers were disposed of. A mixture of 530 ml 95% ethyl alcohol (ethanol) and 190 ml distilled water was added to the final precipitate and the slurry was stirred using a magnetic stirrer for 30 minutes at room temperature. The pH of the slurry was adjusted from 5.88 to 4.0 with 4.5 ml glacial acetic acid while continuously mixing. The slurry was centrifuged at 25,000×g for 15 minutes. To the supernatant, 0.85 ml hydrogen peroxide were added followed by addition of 0.75 ml formaldehyde and 0.25 ml of a 0.5N HCl (catalyst for formaldehyde) solutions. Two and a half g (2.5 g) of the plasticizer glycerol were added and the mixture was then evaporated until about ¼ of the initial liquid remained. The solution was cast on an inert flat surface (glass) using a thin-layer chromatography spreader apparatus set to 1 mm thickness. The film was dried at room temperature (24% RH) for 12 hours. After drying, the film was easily removed from the surface. The dried film weighed 5.4 g, was transparent, flexible, strong, and had a thickness of 5 mil.

EXAMPLE 4

This example shows a transparent film formed using hexane as the non-polar solvent mixed with water in the same step, glycerol as plasticizer, hydrogen peroxide as a bleaching agent and formaldehyde solution as the cross-linking agent.

To 150 g bread wheat flour, 300 ml hexane (pure) was added and the slurry stirred for 5 minutes at which point 300 ml distilled water was added and mixing was continued for 15 minutes. The upper hexane fraction was discarded and the rest of the slurry was centrifuged at 20,000×g for 15 minutes. The supernatant or any upper layer were discarded and a mixture of 530 ml 95% ethyl alcohol (ethanol) and 190 ml distilled water was added to the precipitate and the slurry was stirred using a magnetic stirrer for 30 minutes at room temperature. The pH of the slurry was adjusted from 6.13 to 4.0 with 12.2 ml glacial acetic acid while continuously mixing. The slurry was centrifuged at 25,000×g for 15 minutes. To the supernatant, 0.85 ml hydrogen peroxide were added followed by addition of 0.75 ml formaldehyde and 0.25 ml of a 0.5N HCl (catalyst for formaldehyde) solutions. 2.75 g of the plasticizer glycerol were added and the mixture was then evaporated until about ¼ of the initial liquid remained. The solution was cast on an inert flat surface (glass) using a thin-layer chromatography spreader apparatus set to 1 mm thickness. The film was dried at room temperature (20% RH) for 12 hours. After drying, the film was easily removed from the surface. The dried film weighed 10.9 g, was transparent, flexible, strong, and had a thickness of 6 mil.

EXAMPLE 5

This example shows two transparent films formed using a common film forming solution. First was cast by drying in an oven, the other was cast at room temperature.

To 600 g bread wheat flour, 1000 ml hexane (pure) was added and the slurry stirred for 5 minutes at which point 1500 ml distilled water was added and mixing was continued for 10 minutes. The slurry was centrifuged at 18,000×g for 15 minutes. The supernatant or any upper layer were discarded and 2160 ml of a 70% ethanol solution was added to the precipitate and the slurry was stirred using a blender for 1 minute. Mixing continued using a magnetic stirrer for 30 minutes at room temperature. Centrifugation was performed at 18,000×g and the precipitate was disposed of. While continuously mixing, the pH of the supernatant was adjusted to 4.0 with glacial acetic acid followed by the addition of 40 ml of hexane, mixing for 5 extra minutes. This solution was kept as base for making the following films:

FILM #1 (with heating of formaldehyde and oven drying)—To 250 ml of the supernatant solution, 1 ml of glycerol (plasticizer) was mixed in. The solution was then heated to its boiling point (around 83° C.) and 0.38 ml of formaldehyde solution was added. The mixture was evaporated until about ¼ of the initial liquid remained. The solution was cast on an inert flat surface (glass) using a thin-layer chromatography spreader apparatus set to 1 mm thickness. The film was dried in an oven set to 50° C. (10% RH) for 12 hours. After drying, the film was easily removed from the surface. The dried film weighed 6.85 g, was transparent, flexible, strong, and had a thickness of 3 mil.

FILM #2 (Film with room temperature drying)—To 1000 ml of the supernatant solution, 4 ml of glycerol (plasticizer) was mixed in. The solution was then heated to its boiling point (around 83° C.) and 1.5 ml of formaldehyde solution was added. The mixture was evaporated until about ¼ of the initial liquid remained. The solution was cast on an inert flat surface (glass) using a thin-layer chromatography spreader apparatus set to 1 mm thickness. The film was dried at room temperature (20% RH) for 24 hours. After drying, the film was easily removed from the surface. The dried film weighed 24.4 g, was transparent, flexible, strong, and had a thickness of 3 mil.

EXAMPLE 6

This example shows a transparent film formed using hard red winter wheat flour, hexane as the non-polar solvent mixed with water in the same step, UNIPLEX as plasticizer, and formaldehyde solution as the cross-linking agent.

To 500 g of hard red winter wheat flour, 500 ml hexane (pure) was added and the slurry stirred for 5 minutes at which point 2500 ml distilled water was added and mixing was continued for 15 minutes. The slurry was centrifuged at 18,000×g for 15 minutes. The supernatant or any upper layer were discarded and the precipitate was put into a blender in which 1800 ml of a 75% ethyl alcohol (ethanol) solution was added and mixed to form a slurry. The slurry was then stirred using a magnetic stirrer for 20 minutes at room temperature. The pH of the slurry was adjusted at 4.0 with 69 ml glacial acetic acid while continuously mixing for 10 more minutes. The slurry was centrifuged at 18,000×g for 15 minutes. 500 ml of the supernatant was boiled and 2.0 ml plasticizer UNIPLEX 108 (from Unitex Chemical Corporation, Greensboro, N.C.) (N-ethyl o/p-Toluene Sulfonamide) was added followed by addition of 1.5 ml formaldehyde solution. The solution was cast on an inert flat surface (glass) using a thin-layer chromatography spreader apparatus set to 0.75 mm thickness. The film was dried at room temperature (20% RH) for 12 hours. After drying, the film was easily removed from the surface. The dried film weighed 10.2 g, was transparent, with a light yellow tint, flexible, strong, and had a thickness of 1.8 mil.

EXAMPLE 7

This example shows a transparent film formed using hard red winter wheat flour, butanol as the nonpolar solvent mixed with water in the same step, glycerol as plasticizer, and formaldehyde solution as the cross-linking agent. In addition, the film forming solution was stored for 110 days before casting the film.

To 500 g of hard red winter wheat flour, 500 ml butanol was added and the slurry stirred for 5 minutes at which point 1500 ml distilled water was added and mixing was continued for 15 minutes. The slurry was centrifuged at 18,000×g for 15 minutes. The supernatant or any upper layer were discarded and the precipitate was put into a blender in which 1800 ml of a 75% ethyl alcohol (ethanol) solution was added and mixed to form a slurry. The slurry was then stirred using a magnetic stirrer for 20 minutes at room temperature. The pH of the slurry was adjusted at 4.0 with 65 ml glacial acetic acid while continuously mixing for 10 more minutes. The slurry was centrifuged at 18,000×g for 15 minutes. The film forming solution was stored for 110 days at room temperature. After this storage time, to 250 ml of the solution was added 1.3 g glycerol (plasticizer). The solution was boiled followed by addition of 0.25 ml formaldehyde solution. The supernatant was boiled while stirring until about ¼ of the initial liquid remained and cast on an inert flat surface (glass) using a thin-layer chromatography spreader apparatus set to 0.75 mm thickness. The film was dried at room temperature (20% RH) for 12 hours. After drying, the film was easily removed from the surface. The dried film weighed 6.1 g, was transparent, flexible, strong, and had a thickness of 1.9 mil.

EXAMPLE 8

This example shows a transparent film formed using gluten powder as the source of wheat proteins. In addition, hexane was used as the non-polar solvent, glycerol as plasticizer, and formaldehyde solution as the cross-linking agent.

To 60 g of gluten powder, 100 ml hexane was added and the slurry stirred for 5 minutes at which point 400 ml of a 75% ethyl alcohol (ethanol) solution was added and stirred using a magnetic stirrer for 20 minutes at room temperature. The pH of the slurry was adjusted to 4.0 with 28.2 ml glacial acetic acid while continuously mixing for 10 more minutes. The slurry was centrifuged at 15,000×g for 10 minutes. After centrifugation, the precipitate and upper gummy layer were discarded and the 340 ml of remaining solution was saved as film forming solution. To the solution was added 2.5 g glycerol (plasticizer) and 0.5 ml of formaldehyde solution. The solution was boiled while stirring until about ¼ of the initial liquid remained and cast on an inert flat surface (glass) using a thin-layer chromatography spreader apparatus set to 0.75 mm thickness. The film was dried at room temperature (20% RH) for 12 hours. After drying, the film was easily removed form the surface. The dried film weighed 6.1 g, was transparent, slightly yellow in color, flexible, strong, and had a thickness of 6.0 mil.

It is intended that the foregoing description be only illustrative of the present invention and that the present invention be limited only to the hereinafter appended claims.

We claim:

1. A method for forming a transparent polymer which comprises:
   (a) providing a defatted and destarched gluten dissolved in an aqueous solution of a water miscible solvent for the gluten solution;
   (b) mixing the solution with a cross-linking agent which reacts with the gluten and a bleaching agent which bleaches the gluten in the presence of the cross-linking agent, wherein the gluten is cross-linked to provide a polymer in the solution;
   (c) casting the polymer in the solution; and
   (d) drying the polymer to remove at least a portion of the water miscible solvent and water and to provide the transparent polymer.

2. The method of claim 1 wherein the polymer is as a film or coating.

3. A method for the preparation of a transparent polymer which comprises the steps of:
   (a) providing a flour from a cereal grain;
   (b) mixing the flour with an organic solvent which dissolves the fat which is removed with the solvent to provide a defatted flour;
   (c) mixing the defatted flour with ethanol in water solution at a pH between about 3 and 6 to dissolve a gluten fraction in the defatted flour which solution is removed from any non-dissolved materials, including starch;
   (d) mixing the gluten fraction in the solution with a cross-linking agent which reacts to form a transparent film with the gluten fraction and a bleaching agent which bleaches the gluten fraction in the presence of the cross-linking agent, wherein the gluten fraction is cross-linked to provide a polymer in the solution;
   (e) casting the polymer in the solution on a surface; and
   (f) drying the polymer on the surface to remove at least a portion of the solution and to provide the transparent polymer.

4. The method of claim 3 wherein the organic solvent in step (b) is a lower alkane.

5. The method of claim 4 wherein the lower alkane is hexane.

6. The method of claim 3 wherein the solvent is butanol.

7. The method of claim 3 wherein the cereal grain in step (a) is wheat.

8. The method of claim 3 wherein the cross-linking agent is an aldehyde.

9. The method of claim 8 wherein the aldehyde is formaldehyde.

10. The method of claim 3 wherein in step (d) a plasticizer is added to the solution so that the resulting transparent polymer in step (f) is flexible.

11. The method of claim 10 wherein the plasticizer is glycerol.

12. The method of any one of claims 3, 4, 5, 6, 7, 8, 9, 10 or 11 wherein in step (f) the polymer is dried in air at ambient temperatures to remove the solution.

13. The method of any one of claims 3, 4, 5, 6, 7, 8, 9, 10 or 11 wherein in step (f) the polymer is dried by heating to remove the solution.

14. The method of any one of claims 3, 4, 5, 6, 7, 8, 9, 10 or 11 wherein the dried polymer is as a film.

15. The method of any one of claims 3, 4, 5, 6, 7, 8, 9, 10 or 11 wherein the dried polymer is as a coating.

16. The method of claim 3 wherein the defatted flour in step (b) is centrifuged with the organic solvent and then defatted flour is separated from the solvent.

17. The method of claim 3 wherein the gluten fraction in step (c) is centrifuged to remove non-dissolved materials.

* * * * *